Oct. 10, 1944.　　　I. B. LAWYER　　　2,360,000
INJECTION MOLDING UNIT
Filed Oct. 24, 1940　　　3 Sheets-Sheet 1
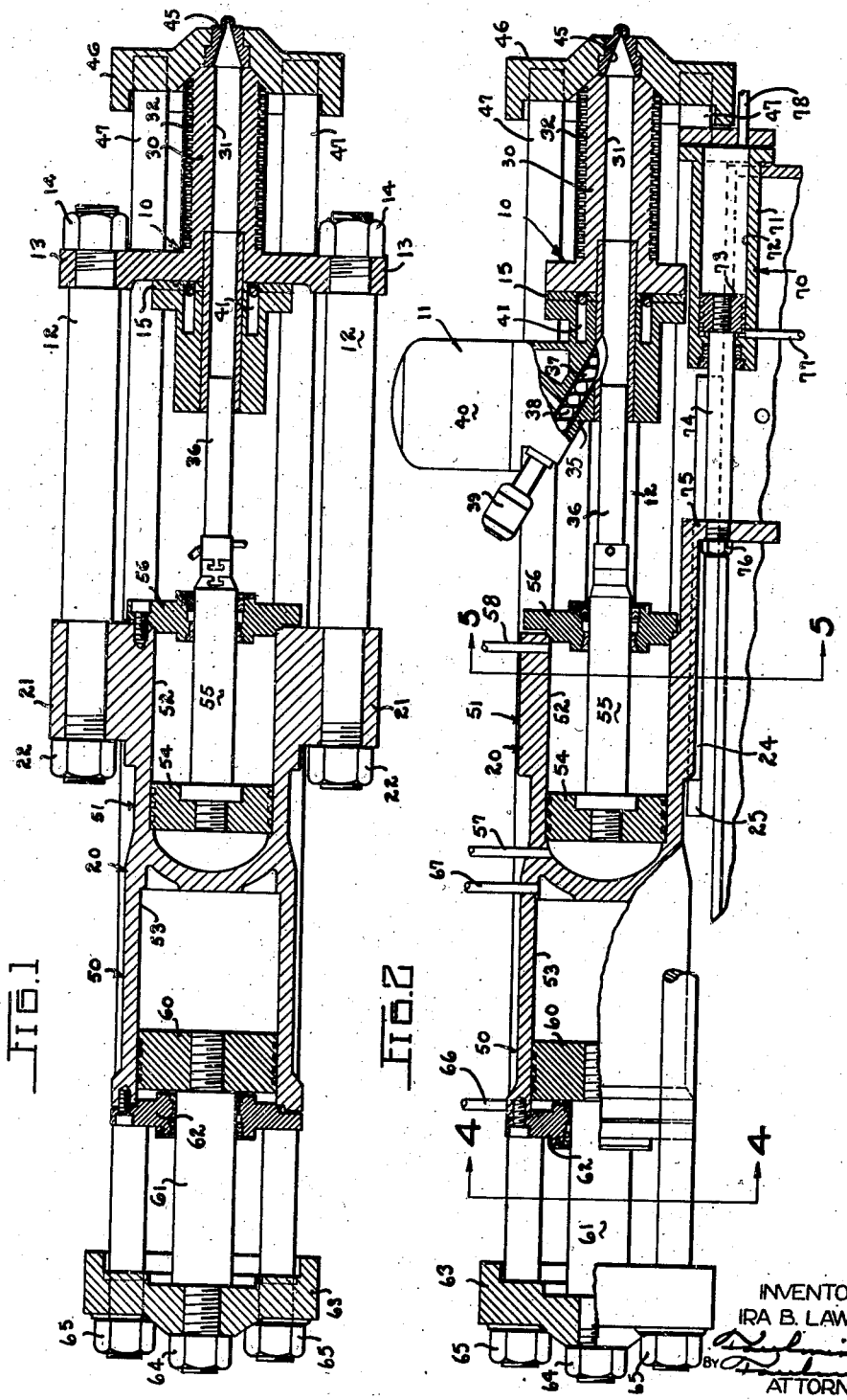
INVENTOR
IRA B. LAWYER
BY
ATTORNEYS Oct. 10, 1944.  I. B. LAWYER  2,360,000
INJECTION MOLDING UNIT
Filed Oct. 24, 1940  3 Sheets-Sheet 2
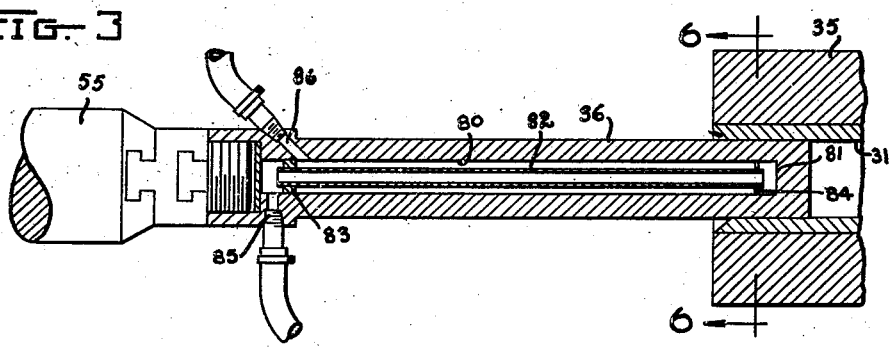
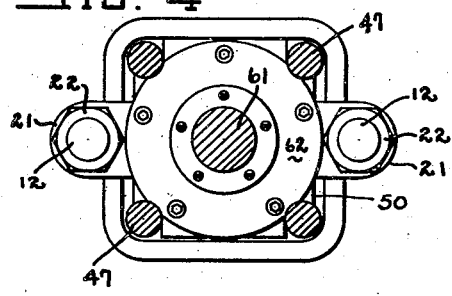
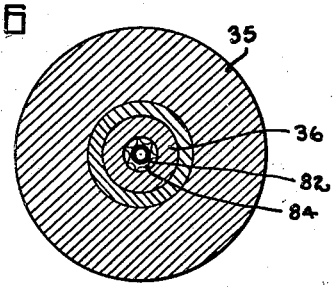
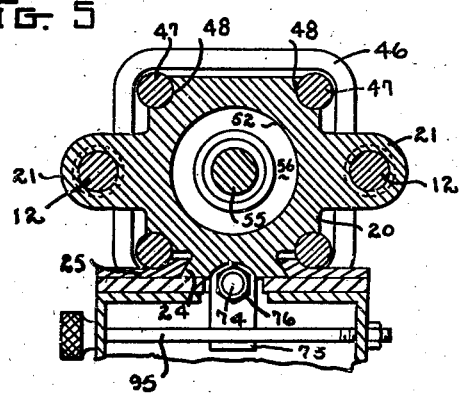
INVENTOR
IRA B. LAWYER
ATTORNEYS

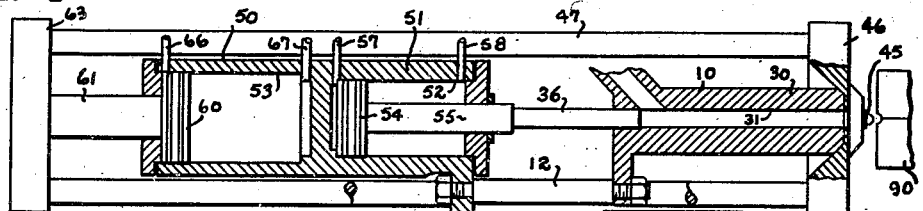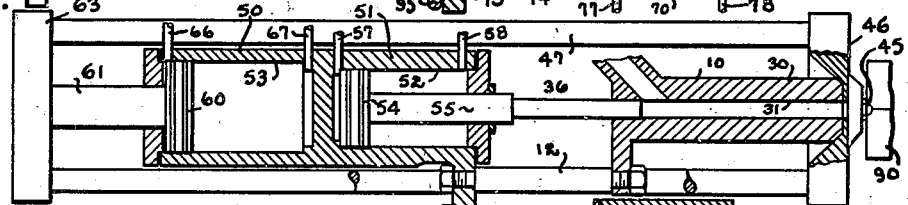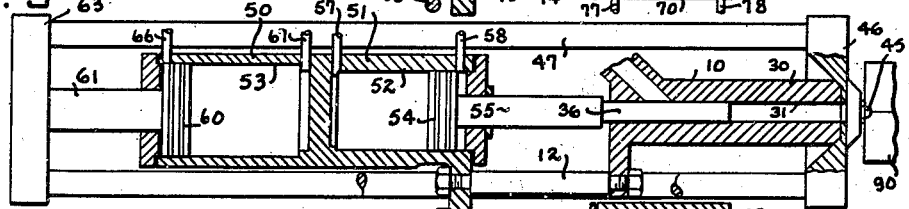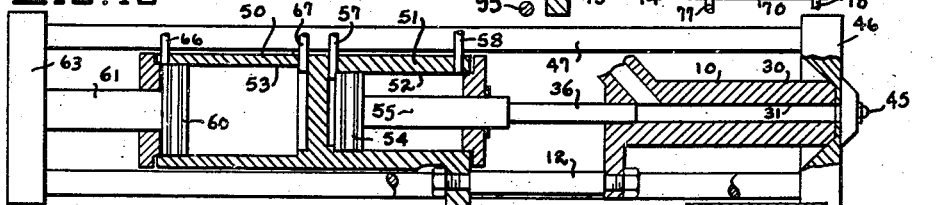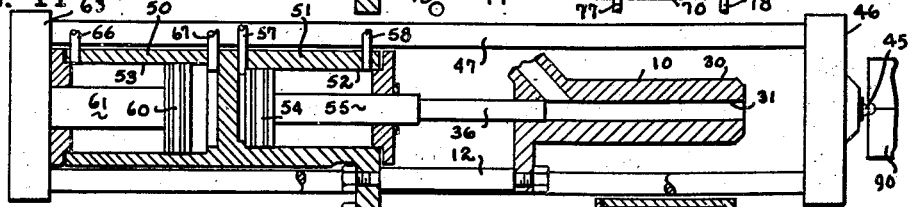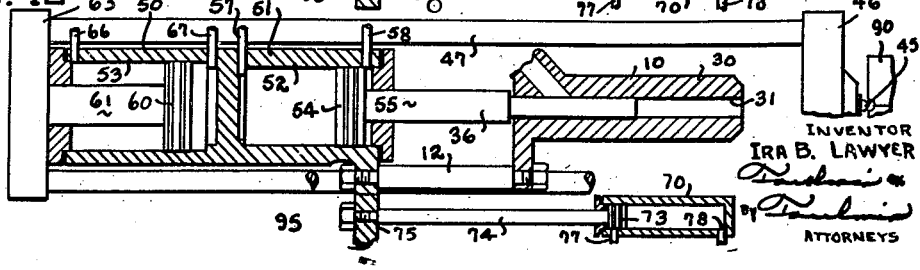

Patented Oct. 10, 1944

2,360,000

UNITED STATES PATENT OFFICE 2,360,000

INJECTION MOLDING UNIT

Ira B. Lawyer, Mount Gilead, Ohio, assignor to The Hydraulic Development Corp., Inc., Wilmington, Del., a corporation of Delaware Application October 24, 1940, Serial No. 362,631

15 Claims. (Cl. 18—30)

This invention relates to machines for injecting plastics into a mold, and more specifically relates to machines for injecting those plastic materials which set upon being heated, such as thermosetting resins.

When molding articles by the injection method, and particularly when molding the articles from thermosetting resins, considerable difficulty has been experienced in having the resins set within the injection chamber of the machine. In the general practice of injecting plastics the machines heretofore used were incapable of the injection molding of thermosetting resins, or any resin which has a tendency to set. Once a thermosetting resin has hardened within the injection chamber of the machine it has heretofore been practically impossible to move the hardened slug of the material and to clean the nozzle of the machine properly without dismantling the injection chamber and the nozzle assembly.

It is therefore an object of the invention to provide a machine for the injection molding of plastic materials which is capable of rapid disassembly of the injection nozzle from the injection cylinder to permit cleaning thereof.

It is also an object of the invention to provide a machine for the injection of plastics wherein the nozzle of the machine can be quickly and easily positioned a substantial distance from the injection cylinder to permit the machine to be operated through an injection stroke and eject a slug of material from the injection chamber, whereby the chamber is cleaned of hardened or foreign material.

It is another object of the invention to provide a machine for the injection of plastics wherein the injection nozzle is supported independent of the injection cylinder.

It is another object of the invention to provide a machine according to the foregoing object wherein the independently supported injection nozzle is mounted in a manner that it can reciprocate with respect the injection cylinder, and to provide means for causing such reciprocation, the reciprocating means also providing a means for retaining the nozzle in engagement with the injection cylinder so that the nozzle and cylinder can operate as a unit.

It is another object of the invention to provide an injection unit wherein the nozzle is independently mounted, and means are provided for retaining the nozzle in sealing engagement with the injection cylinder.

It is still another object of the invention to provide an assembly consisting of the injection cylinder, an independently mounted nozzle, means for ejecting material from the cylinder and a means for reciprocating the nozzle with respect the cylinder, the assembly being reciprocable as a unit with respect of the dies of the injection molding machine, the elements of the assembly being arranged in such a manner that the nozzle can be advanced a considerable distance ahead of the injection chamber to permit a slug of material to be ejected from the injection cylinder by normal operation of the ejecting means.

Another object of the invention is to provide a machine for injection molding which is capable of handling thermosetting resins, the ejection cylinder and nozzle of which is readily opened to permit cleaning thereof.

A still further object of the invention is to provide a machine for injecting plastic materials in accordance with the foregoing objects wherein hydraulic motors are provided for performing the various operating functions.

Another object of the invention is to provide an injection unit wherein the injection cylinder is provided with an unobstructed material passageway when the injection nozzle is removed therefrom to permit a mass of hardened material to be ejected from the open end of the cylinder by means of the injection plunger operating within the cylinder.

Further, objects and advantages will be apparent from the description and the disclosure in the drawings.

In the drawings:

Figure 1 is a plan cross-sectional view of the injection apparatus of a plastics injection machine arranged for accomplishing the purposes of this invention;

Figure 2 is a vertical cross-sectional view taken substantially along the center line of Figure 1;

Figure 3 is a horizontal cross-sectional view of the injection plunger;

Figure 4 is a vertical cross-sectional view taken along line 4—4 of Figure 2;

Figure 5 is a vertical cross-sectional view taken along line 5—5 of Figure 2;

Figure 6 is a vertical cross-sectional view taken along line 6—6 of Figure 3;

Figure 7 is a diagrammatic vertical cross-sectional view of the injection apparatus of a plastics injection machine, and showing its normally retracted relation with respect the dies of a plastics injection machine;

Figure 8 is a diagrammatic vertical cross-sectional view of the injection apparatus of a plastics injection machine, and showing its normally advanced relation with respect the dies of a plastics injection machine;

Figure 9 is a diagrammatic vertical cross-sectional view of the injection apparatus of a plastics injection machine, and showing the injection plunger at the end of its injection stroke;

Figure 10 is a diagrammatic vertical cross-sectional view of the injection apparatus of a plastics injection machine, and showing the injection apparatus fully retracted from the dies of the plastics injection machine;

Figure 11 is a diagrammatic vertical cross-sectional view of the injection apparatus of a plastics injection machine, and showing the injecting apparatus fully retracted from the dies of the plastics injection machine, but with the nozzle and supporting means advanced to permit access into the interior of the nozzle and the cylinder;

Figure 12 is a diagrammatic vertical cross-sectional view of the injection apparatus of a plastics injection machine, and showing the injection apparatus in the same position as that of Figure 11 except that the injection plunger is advanced to cause expulsion of a slug of material from the injection cylinder.

When injection molding plastic materials, such as the thermosetting resins, considerable difficulty has been encountered in that the material will set within the injection chamber of the plastics injection machine. Unless the machine is designed to permit easy disassembly of the injection nozzle from the injection cylinder, and means are provided for removing the slug of hardened material from the injection cylinder, the injection machines heretofore used are of little value for the injection molding of thermosetting plastic materials.

In this invention, therefore, I provide an apparatus wherein the nozzle for the injection cylinder is independently supported, and which can be readily removed from the end of the injection cylinder to permit access to both elements. The injection nozzle of this invention is retained adjacent the end of the injection cylinder by suitable means, such as a hydraulic motor, during the injection cycles of the plastics injection machine. If the plastic material which is being ejected from the machine should set within the injection chamber or the nozzle, the hydraulic motor can be operated to advance the nozzle away from the end of the injection cylinder. The operating functioning of the injection plunger for the injection cylinder is not disturbed, hence the injection plunger may be caused to traverse a full operating stroke within the injection cylinder to eject the slug of hardened material within the cylinder. Since the ejection nozzle will be advanced considerably forward of the injection cylinder the nozzle itself may be readily cleaned.

To accomplish the functioning of the apparatus, as heretofore mentioned, I provide a plastics injection apparatus consisting of an injection unit 10 and a feeding unit 11 which are carried by a pair of strain rods 12. The strain rods 12 engage outwardly extending flanges 13 positioned upon the injection unit 10 and are secured to the flanges 13 by means of the bolts 14. The feeding unit 11 is suitably supported upon the injection unit 10 and is insulated therefrom by means of the insulating pad 15.

The strain rods 12 are carried upon a casting 20, the ends of the strain rods extending through flanges 21 provided on the casting 20 and secured in position by means of the bolts 22. The casting 20 is supported upon the bed 23 by means of the dovetail 24 and the ways 25, the ways 25 being suitably secured upon the bed 23. The association of the dovetail 24 with the ways 25 provides means whereby the casting 20 can be reciprocated longitudinally along the bed 23.

Since the injection unit 10 is supported upon the casting 20 by means of the strain rods 12, it may be seen that the entire assembly consisting of the feeding unit 11, the injection unit 10 and the casting 20, with the associated elements thereon will be reciprocated as a unitary assembly.

The injection unit 10 consists of an injection cylinder 30 which is provided with a uniform internal bore 31. A spirally arranged passage 32 is provided around the periphery of the injection cylinder 30. This passage 32 provides means through which a heating fluid can be circulated for elevating the temperature of the injection cylinder 30 and thus heating the material fed into the injection cylinder. The feeding unit 11 is provided for automatically feeding definite quantities of materials into the internal cylinder bore 31.

The feeding unit 11 consists of a supporting casting 35 having an internal bore which is arranged to cooperate with the internal bore 31 of the injection cylinder, whereby an injection plunger 36 can reciprocate within the internal cylinder bore 31 to cause movement of a mass of material therein. The supporting casting 35 is provided with an angular opening 37 in which there is positioned a feed screw 38 suitably driven by an electric motor 39. The feed screw 38 is adapted to direct material from the hopper 40 through the passage 37 and into the cylinder bore 31. Suitable means for controlling the operation of the electric motor in intermittent cycles may be provided for controlling the quantity of material which is fed into the cylinder intermittently, all of which controls are well-known in the art. A passage 41 is provided within the supporting casting 35 adjacent the throat of the feed opening 37 to retain the material within the cylinder bore 31 at a low temperature within the area in which the material is fed into the bore 31. The insulating pad 15 prevents heat from being transmitted from the injection unit 30 to the feeding unit 11.

The injection unit 30 is provided with a nozzle 45 which is carried within a support member 46. The support member 46 is carried upon a plurality of rods 47, which rods are slidably supported upon the casting 20, as indicated at 48. The rods 47 are arranged in a manner to support the nozzle 45 in coaxial alignment with the cylinder bore 31 of the injection cylinder 30. The support member 46 and the nozzle 45 are thus supported independent of the injection cylinder 30, but the nozzle 45 is retained in engagement with the end of the injection cylinder 30 during normal working operation by suitable means hereinafter described. Since the nozzle 45 is carried upon an independently supported member 46, it may be seen that the member 46 and the nozzle 45 can be readily removed from the end of the injection cylinder 30 to permit access to the interior of the nozzle 45 and the cylinder bore 31.

To provide means for operating the injection plunger 36 and for controlling the position of the nozzle 45 and support member 46 a pair of hydraulic motors 50 and 51 are provided within the casting member 20. The hydraulic motor 51 consists of a cylinder bore 52 within the casting 20, while the hydraulic motor 50 consists of a cylinder bore 53. A piston 54 is positioned within the cylinder bore 52 and is provided with a plunger 55 which extends through the end wall 56, which wall provides a closure for the open end of the cylinder bore 52. The plunger 55 is suitably connected with the injection plunger 36, whereby the same is reciprocated when piston 54 is caused to reciprocate within the cylinder 52. Fluid connections 57 and 58 are provided at opposite ends of the cylinder 52 for ingress and egress of fluid into the cylinder 52.

The fluid passing through the fluid lines 57 and 58 is controlled by means of a suitable valving arrangement which is operated either automatically or manually to control the reciprocation of the pistons 54 within the cylinder 52, whereby reciprocation of the plunger 36 is controlled for cyclically ejecting material from the ejection cylinder 30. The controls for operating the hydraulic motor 51 are conventional controls and are well-known in the art, hence further disclosure and description is not deemed necessary.

The hydraulic motor 50 consists of a piston 60 operating within the cylinder bore 53. A plunger 61 is secured to the piston 60 and extends through the end closure wall 62 provided for the cylinder bore 53. The extending end of the plunger 61 is secured to a head 63, the plunger 61 extending through the head 63 and being secured thereto by means of the bolt 64. The guide rods 47 for the nozzle support 46 extend through the head 63 and are secured thereto by means of the bolts 65. Suitable fluid connections 66 and 67 are provided for the hydraulic motor 50 for the ingress and egress of fluid to and from the cylinder 53 for reciprocating the piston 60 therein.

Since the support rods 47 for the nozzle support 46 are secured to the head 63, it may be seen that reciprocation of the piston 60 within the hydraulic motor 50 will provide a means for reciprocating the nozzle support 46, and for providing hydraulic means for applying pressure upon the nozzle support 46 against the end of the injection cylinder 30 to retain the nozzle support 46 in sealing engagement with the injection cylinder.

The complete assembly of the injection unit 10, the feeding unit 11 and the hydraulic motors 50 and 51 is thus constructed and arranged in a manner that these elements may operate as a unit structure which can be reciprocated with respect the molding dies of a plastic injection machine, the entire assembly being supported by the dovetail 24 upon the ways 25.

To provide means for reciprocating the assembly, a hydraulic motor 70 is provided. This motor consists of a cylinder 71 which is secured to the bed 23 in any suitable manner. The cylinder 71 is provided with a cylinder bore 72 within which a piston 73 can reciprocate. The piston 73 is provided with a plunger 74 extending through an end wall of the cylinder chamber 72. The protruding end of the plunger 74 extends through a flange 75 provided upon the casting member 20, and is secured thereto by means of a bolt 76. Suitable fluid connections 77 and 78 are provided for the hydraulic motor 70 for causing ingress and egress of fluid to and from the cylinder bore 72, whereby the piston 73 is caused to reciprocate therein. Since the hydraulic motor 70 is stationarily secured upon the bed 23 of the machine, reciprocation of the piston 73 provides means whereby the assembly consisting of the injection unit 10, the feeding unit 11 and the hydraulic motors 50 and 51 may be reciprocated upon the bed of the machine.

The fluid lines 77 and 78 for the hydraulic motor 70 are provided with suitable valves for controlling the flow of fluid to and from the cylinder 72. These valves are under either manual or automatic control, which controls are well-known in the art.

When working with plastic materials, and particularly the thermosetting resins, the plastic material frequently assumes a state of fluidity which is of such fluency that when the plunger 36 advances material through the cylinder bore 31 of the injection cylinder 30 the fluid material flows between the plunger 36 of the cylinder wall 31. When using materials which set upon heating, such as the thermosetting resins, the plunger is quite frequently caused to stick within the ejection cylinder 30.

To prevent the material adjacent the end of the plunger 36 from arriving at a state of fluidity which produces the above result, I provide means for circulating a cooling fluid within the plunger 36. The plunger 36 is thus provided with a central bore 80 which extends longitudinally of the plunger 36 and terminates closely adjacent the end 81 of the plunger 36. A tube 82 is positioned centrally within the bore 80 and is supported at one end by means of a solid collar 83 and at the opposite end by means of a spider collar 84. A fluid inlet 85 and a fluid outlet 86 is provided for directing the flow of a cooling circulating fluid within the plunger 36. The cooling fluid enters through the inlet 85 and passes through the tube 82 into thermal contact with the end 81 of the plunger 36, whereby the end of the plunger is retained in a substantially cool condition. The cooling fluid returns through the spider collar 84 and within the space formed between the tube 82 and the bore 80 to the outlet passage 86.

Since the end 81 of the plunger 36 is retained in a cool condition, it may readily be seen that the plastic material adjacent the end 81 will be retained at a lower temperature than the remaining volume of material within the cylinder bore 31. The state of fluidity of the material adjacent the end 81 of the plunger 36 is thus retained as a heavier body of fluid, whereby the plastic material is prevented from flowing between the plunger 36 of the cylinder bore 31.

When the injection machine is in condition for normal cycling operation, fluid under pressure has been admitted through the conduit 67 of the fluid motor 50 to cause the piston 60 to move toward the left end of the cylinder of the hydraulic motor 50, as indicated in Figure 7. Movement of the piston 60 has caused the plunger 61 to move the head 63 in a manner that the support rods 47 have carried the nozzle support 46 into engagement with the end of the injection cylinder 30. The pressure of the hydraulic fluid within the cylinder 53 of the hydraulic motor 50 provides means for applying sealing pressure between the nozzle support 46 and the injection cylinder 30 to prevent escape of plastic material therebetween when the machine is being cycled. Under all normal operations the nozzle support 46 is retained in this position adjacent the end of the injection cylinder 30.

At the beginning of an injection cycle the injection unit has been retracted from the molding die 90 by means of the hydraulic motor 70. The normal retraction movement for the injection unit is small, hence a stop is provided to prevent the injection unit from being retracted more than a predetermined amount, the hydraulic motor 70 being capable of retracting the injection unit a considerably greater distance than is required for normal operation. The stop for controlling the normal retraction movement of the injection unit consists of a rod 95 which extends between opposite walls of the bed 23. The rod 95 can be manually removed to permit full retraction of the injection unit under certain conditions which will be hereinafter described. The flange 75 provided on the casting 20 extends downwardly to an extent that it will engage the stop rod 95, whereby the movement of the assembly supported by the casting 20 is limited in its reciprocal movement when the hydraulic motor 70 is operated.

As indicated in Figure 7, the injection machine is in position for the beginning of an injection cycle. At this time hydraulic fluid is present within the right end of the hydraulic motor 70 whereby the injection unit is retracted from the molding dies 90, as regulated by the stop rod 95.

When the injection cycle is started, the valves in the fluid lines 77 and 78 are shifted either manually or automatically to permit fluid to enter the line 77, and to permit fluid to be discharged from the hydraulic motor 70 through the line 78. The piston 73 will thus be moved to the right within the hydraulic motor 70, causing the casting 20 and the elements assembled thereon to be moved to the right. The nozzle 45 of the injection unit is thus brought into engagement with the molding die 90, as indicated in Figure 8.

Either prior to or after the nozzle 45 is in engagement with the molding dies 90, a predetermined quantity of plastic material has been fed into the cylinder bore 31 of the injection cylinder 30. It is to be understood, of course, that a heating fluid is continuously circulating through the heating passages 32 of the injection cylinder 30 whereby the material is continuously heated and brought to a state of plasticity to be capable of being ejected from the ejection cylinder through the nozzle 45.

Fluid under pressure is then admitted through the fluid line 57 into the left end of the hydraulic motor 50, the fluid within the right end of the motor being discharged through the line 58. Admission of fluid to the left end of the hydraulic motor 50 causes the piston 54 to move toward the right end of the hydraulic motor, thereby causing the ejection plunger 36 to advance through the cylinder bore 31 of the injection cylinder 30. The material ejected from the ejection cylinder enters the cavities within the molding dies 90 for forming the desired work pieces. The final position of the ejection plunger at the end of the ejection stroke is indicated in Figure 9. Fluid is then admitted through the fluid line 58 to cause retraction of the plunger 36 to bring the plunger into the position indicated in Figure 8, so that a new charge of material can be fed into the cylinder 31 by means of the feeding unit 11. While the injection plunger is being retracted, fluid is admitted through the fluid line 78 of the hydraulic motor 70 to cause normal retraction of the injection unit, whereby the nozzle 45 is removed from the forming dies 90. The dies 90 may then be opened and the work pieces removed. The machine is then in condition for another cycle of operation.

This normal cycling of the machine will continue until such time as the nozzle 45 becomes clogged, or a charge of material has become hardened within the injection cylinder bore 31. At this time it becomes necessary to quickly remove the nozzle from the injection cylinder to permit the elements to be cleaned and to accomplish the cleaning operation with a minimum of effort and to get the machine back into operation as rapidly as possible. This is particularly true when the machine is being used in production processes.

When the machine has ceased to function, due to a clogging of the injection cylinder or nozzle, the stop rod 95 is removed. Fluid pressure is then admitted to the hydraulic motor 70 through the fluid line 78 causing the piston 73 to move completely to the left end of the hydraulic motor 70, whereby the injection assembly is retracted a substantial distance from the molding dies 90. Hydraulic fluid is then directed to the hydraulic motor 50 through the fluid line 66 whereby the piston 60 of the motor 50 is caused to move to the right end thereof. Reciprocation of the piston 60 causes the head 63 to move the support rods 47 for the nozzle support 46, whereby the nozzle support 46 and the nozzle 45 are advanced a considerable distance away from the end of the injection cylinder 30. This position of the injection machine is indicated in Figure 11.

When the machine is in this position the interior of the nozzle 45 is accessible for cleaning, or the nozzle 45 may be removed and replaced by a new nozzle. If the nozzle only has been clogged, or if replacement of the nozzle was desired, the hydraulic motor 50 may then be operated by admission of fluid through the line 67 to cause the nozzle support 46 and the nozzle 45 to be returned to their positions adjacent the end of the injection cylinder 30.

If, however, plastic material has hardened or set within the bore 31 of the injection cylinder 30, the slug of hardened material must be removed. To remove the slug of hardened material from the bore 31, the injection plunger 36 may be caused to pass through an injection stroke by admitting fluid to the hydraulic motor 51 through the fluid line 57. This position of the machine is shown in Figure 12. Since the cylinder bore 31 has been heretofore mentioned as a uniform bore, it may readily be seen that a slug of hardened material will easily pass from the bore 31 when hydraulic pressure is applied upon the mass of the material therein by means of the hydraulic motor 51. The slug of material will fall from the end of the injection cylinder 30 and pass downwardly between the injection cylinder and the nozzle support 46.

After the nozzle has been cleaned and the slug of hardened material ejected from the injection cylinder 30, the nozzle support may be returned adjacent the end of the injection cylinder by causing fluid to enter the hydraulic motor 50 through the fluid line 67, and thereby applying pressure upon the nozzle 45 and support 46 for sealing the same in engagement with the end of the injection cylinder 30. The injection plunger 36 may then be retracted by causing fluid to be admitted through the fluid line 58 of the hydraulic motor 51, while the entire assembly is again advanced into normal operating relation with the molding dies 90 by means of the hydraulic motor 70, the hydraulic fluid being admitted through the fluid lines 77. The stop pin 95 is replaced, and the machine is then ready for normal cycling operation.

It may thus be seen that I have provided a machine which is particularly adaptable for injection molding materials which have a tendency to set or harden while within the injection cylinder, the machine being particularly adaptable for the injection molding of thermo-setting plastic materials. The independently supported nozzle provides an arrangement whereby a hydraulic means can be utilized for quickly removing the nozzle from the injection cylinder, the various functions of the injection machine thus being accomplished by hydraulic action.

While I disclose a particular apparatus for performing the specific functions of my invention, yet I do not wish to limit my invention to a specific structure, but rather there are many structures which are capable of producing the results of my invention, all of which come within the scope thereof.

Having thus fully described my invention, what I claim as new and desire to secure by Letters Patent, is:

1. An injection molding unit comprising, an injection cylinder movable toward and away from a molding die, an injection nozzle member positioned against the forward end of said cylinder movable therewith toward a molding die and movable axially relative thereto, means for removably supporting said nozzle axially adjacent said cylinder, and means movable with said injection cylinder for moving said nozzle axially toward and away from the end of said cylinder to permit cleaning thereof.

2. An injection molding unit comprising, an injection cylinder movable toward and away from a molding die, an injection nozzle member positioned against the forward end of said cylinder movable therewith toward a molding die and movable axially relative thereto, means for supporting said nozzle independently and axially of said cylinder, and means movable with said injection cylinder for moving said nozzle axially toward and away from the end of said cylinder to permit cleaning thereof, said last mentioned means also providing means for causing sealing engagement between said cylinder and said nozzle when in operating relationship.

3. An injection molding machine comprising a working unit consisting of, an injection cylinder, an injection nozzle for said cylinder, means for independently supporting said nozzle in working alignment with said cylinder, means for causing to and fro movement of said nozzle axially with respect to said cylinder and for normally retaining said nozzle in working relation with said cylinder, means for ejecting material from said cylinder; a mold supported adjacent the working unit, means for causing reciprocation of the working unit with respect to said mold to provide intermittent normal working separation of the nozzle from the mold.

4. An injection molding machine comprising a working unit consisting of, an injection cylinder, an injection nozzle for said cylinder, means for independently supporting said nozzle in working alignment with said cylinder, means for causing to and fro movement of said nozzle in the direction of its axis with respect to said cylinder and for normally retaining said nozzle in working relation with said cylinder, and means for ejecting material from said cylinder; a mold supported adjacent the working unit and means for causing reciprocation of the working unit with respect to said mold to provide intermittent normal working separation of the nozzle from the mold, said last mentioned means providing means to cause greater than normal working separation of said unit from the mold.

5. An injection molding machine comprising a working unit consisting of, an injection cylinder, an injection nozzle for said cylinder, means for independently supporting said nozzle in working alignment with said cylinder, means for causing to and fro movement of said nozzle in the direction of its axis with respect to said cylinder and for normally retaining said nozzle in working relation with said cylinder, and means for ejecting material from said cylinder; a mold supported adjacent the working unit and means for causing reciprocation of the working unit with respect to said mold to provide intermittent normal working separation of the nozzle from the mold, said last mentioned means providing means to cause greater than normal working separation of said assembly from the mold, said second mentioned means providing means to advance the nozzle support and nozzle away from said cylinder, whereby the interior of the cylinder and nozzle is open for cleaning the same.

6. An injection molding unit comprising an injection cylinder, an injection plunger reciprocable in said cylinder, means for reciprocating said plunger in said cylinder, an injection nozzle positioned against the end of said cylinder and supported for movements axially towards and from said cylinder, means adjacent the end of said cylinder for supporting said nozzle in axial alignment with said cylinder, means adjacent said cylinder engaging said support for causing movement of said nozzle support with respect to said cylinder to move said nozzle axially thereto, and means adjacent said plunger reciprocating means for actuating said last mentioned means.

7. An injection molding unit comprising a movable injection cylinder, an injection plunger reciprocable in said cylinder, means for reciprocating said plunger in said cylinder, an injection nozzle positioned against the end of said cylinder movable therewith and relative thereto supported for movements axially towards and from said cylinder, means independent of and adjacent said cylinder for supporting said nozzle in axial alignment with said cylinder, and means adjacent to and in axial alignment with said plunger reciprocating means operably connected to said support for causing axial movement of said nozzle support with respect to said cylinder.

8. An injection molding device comprising a unit consisting of an injection cylinder, an injection nozzle supported for movements axially towards and from said cylinder, means independent of said cylinder for supporting said nozzle in axial alignment with said cylinder, means in axial alignment with said cylinder and engaging said support for causing axial movement of said nozzle support with respect to said cylinder, and means in axial alignment with said cylinder for ejecting material from said cylinder; a mold supported adjacent said unit, and means for moving said unit toward and away from said mold.

9. A continuous cycle injection machine for thermo-setting resins comprising, molding dies, an injection cylinder movable toward and away from said molding dies, said cylinder having a substantially constant bore therethrough, an injection nozzle for said cylinder independently supported in sealing engagement with the end of said cylinder and movable therewith, means for feeding material into said cylinder, means for ejecting material from said cylinder, means for positioning said nozzle a substantial distance from the end of said cylinder while maintaining normal alignment of the nozzle with the cylinder, said ejection means being capable of normal ejection operation while said nozzle is separated from said cylinder.

10. An injection machine comprising, molding dies, an injection cylinder movable toward and away from said molding dies, means for feeding material to said cylinder, means for ejecting material from said cylinder, an injection nozzle for said cylinder removably supported in sealing engagement adjacent the end of said injection cylinder and movable therewith, means for separating said nozzle a substantial distance from the end of said cylinder, means for retracting said injection cylinder a substantial distance from said molding dies, said cylinder retracting means and said nozzle separating means being capable of arranging said cylinder and said nozzle a substantial distance apart.

11. An injection machine comprising, molding dies, an injection cylinder movable toward and away from said molding dies, means for feeding material to said cylinder, means for ejecting material from said cylinder, an injection nozzle for said cylinder removably supported in sealing engagement adjacent the end of said ejection cylinder and movable therewith, means for separating said nozzle a substantial distance from the end of said cylinder, means for retracting said injection cylinder a substantial distance from said molding dies, said cylinder retracting means and said nozzle separating means being capable of arranging said cylinder and said nozzle a substantial distance apart, said ejection means being capable of normal operation while said cylinder and nozzle are in open position to eject material into the open space between said cylinder and said nozzle.

12. An injection molding machine for thermosetting resins comprising, molding dies, an injection cylinder movable toward and away from said molding dies, means for heating said cylinder, means for feeding material into said cylinder, means for ejecting material from said cylinder, a nozzle for said cylinder independently supported in sealing engagement with the end of said cylinder and movable therewith, and means for providing substantial separation of said nozzle and said cylinder to provide access into said cylinder.

13. An injection molding machine for thermosetting resins comprising, molding dies, an injection cylinder movable toward and away from said molding dies, means for heating said cylinder, means for feeding material into said cylinder, means for ejecting material from said cylinder, a nozzle for said cylinder removably supported in sealing engagement with the end of said cylinder and movable therewith, and means for providing substantial separation of said nozzle and said cylinder to provide access into said cylinder, said last mentioned means also providing means for retaining sealing engagement of said nozzle with said cylinder during normal operation of the injection machine.

14. In an injection molding machine, an injection cylinder, molding dies in axial alignment therewith, means for feeding material into said cylinder, means for heating said cylinder, an injection plunger operable within said cylinder, a hydraulic motor for reciprocating said plunger, an injection nozzle for said cylinder independently and removably supported adjacent the end of said cylinder, a hydraulic motor for positioning said nozzle with respect to said cylinder, and a hydraulic motor for reciprocating the aforementioned elements as a unit assembly with respect the molding dies of the plastic injection machine.

15. In an injection molding machine, an injection cylinder, molding dies in axial alignment therewith, means for feeding material into said cylinder, means for heating said cylinder, an injection plunger operable within said cylinder, a hydraulic motor for reciprocating said plunger, an injection nozzle for said cylinder independently and removably supported adjacent the end of said cylinder, a hydraulic motor for positioning said nozzle with respect to said cylinder, and a hydraulic motor for reciprocating the aforementioned elements as a unit assembly with respect the molding dies of the plastic injection machine, said last mentioned hydraulic motor being capable of reciprocating the aforementioned assembly a substantial distance from the molding dies, said hydraulic motor for positioning said nozzle being capable of positioning the nozzle a substantial distance from said cylinder while the assembly is in retracted position and said ejection motor being capable of performing an ejection stroke while said nozzle is positioned from said cylinder.

IRA B. LAWYER.